(12) United States Patent
Yasaki et al.

(10) Patent No.: US 11,563,738 B2
(45) Date of Patent: Jan. 24, 2023

(54) CONTROL METHOD AND INFORMATION PROCESSING APPARATUS

(71) Applicant: FUJITSU LIMITED, Kawasaki (JP)

(72) Inventors: Koichi Yasaki, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/998,244

(22) Filed: Aug. 20, 2020

(65) Prior Publication Data

US 2021/0075784 A1 Mar. 11, 2021

(30) Foreign Application Priority Data

Sep. 10, 2019 (JP) .............................. JP2019-164811

(51) Int. Cl.
 *H04L 9/40* (2022.01)
 *H04L 43/50* (2022.01)
(52) U.S. Cl.
 CPC .......... *H04L 63/0853* (2013.01); *H04L 43/50* (2013.01)
(58) Field of Classification Search
 CPC . H04L 63/0853; H04L 43/50; H04L 63/0861; H04L 63/18; H04L 63/0807; H04L 63/083; H04L 67/02; H04L 63/0823; H04L 63/0428; H04L 63/08; H04L 63/0442; H04L 63/102; H04L 63/123; H04L 9/3271; H04L 2463/101; H04L 63/20; H04L 63/10; H04L 63/12; H04L 67/06; H04L 67/325; H04L 41/0806; H04L 41/0654; H04L 45/28; H04L 47/70; H04L 67/00; H04L 67/10; H04L 67/1001;
 (Continued)

(56) References Cited

U.S. PATENT DOCUMENTS

2006/0156385 A1* 7/2006 Chiviendacz ......... H04L 9/3271
 726/2
2010/0058064 A1 3/2010 Kirovski et al.
 (Continued)

FOREIGN PATENT DOCUMENTS

JP 11-187008 A 7/1999
JP 2009-118110 A 5/2009
 (Continued)

OTHER PUBLICATIONS

Srinivas, Sampath et al., "Universal 2nd Factor(U2F) Overview Specification Set:fido-u2f-v1.0-rd-20140209 Review Draft", Feb. 9, 2014, XP055674562, Retrieved from Internet:URL:http://fidoalliance.org/specs/fido-u2f-V1.0-rd-20140209/fido-u2f-overview-v1.0-rd-20140209.pdf.[retrieved on Mar. 6, 2020]; Cited in Extended European Search Report dated Jan. 26, 2021. (24 pages).
 (Continued)

*Primary Examiner* — Djenane M Bayard
(74) *Attorney, Agent, or Firm* — WHDA, LLP

(57) ABSTRACT

A control method executed by a computer, the method includes receiving a program to identifiably display an authentication screen of a service transmitted from an authenticator in response to a reception of a first authentication request from a browser included in a terminal device to the authenticator, the browser displaying the authentication screen at the terminal device, and transmitting the received program to the terminal device.

5 Claims, 14 Drawing Sheets

(58) Field of Classification Search
CPC . H04L 67/1004; H04L 41/0253; H04L 41/18; H04L 41/22; H04L 63/0263; H04L 63/101; H04L 67/1025; H04L 67/34; H04L 67/567; H04L 51/046; H04L 61/4511; H04L 61/5007; H04L 63/0245; H04L 63/168; H04L 65/1059; H04L 65/611; H04L 65/612; H04L 65/613; H04L 67/04; H04L 67/1097; H04L 67/131; H04L 67/141; H04L 67/289; H04L 67/53; H04L 67/561; H04L 67/563; H04L 69/329; H04L 9/3263; H04L 63/06; H04L 63/0227; H04L 63/105; H04L 67/08; H04L 67/14; H04L 67/303; H04L 67/51; H04L 67/56; H04L 67/564; H04L 67/568; H04L 67/59; H04L 69/24; H04L 63/166; H04W 12/06
See application file for complete search history.

(56) References Cited

U.S. PATENT DOCUMENTS

| | | | | |
|---|---|---|---|---|
| 2012/0260192 | A1* | 10/2012 | Detweiler | G06Q 30/02 715/745 |
| 2015/0281225 | A1* | 10/2015 | Schoen | H04L 63/06 726/9 |
| 2016/0164855 | A1* | 6/2016 | Johansson | H04L 9/3226 726/3 |
| 2017/0085388 | A1 | 3/2017 | Fort et al. | |
| 2017/0359342 | A1* | 12/2017 | Magyar | H04L 63/126 |
| 2018/0212785 | A1* | 7/2018 | Peddada | H04W 12/069 |

FOREIGN PATENT DOCUMENTS

| | | |
|---|---|---|
| JP | 2017-152880 A | 8/2017 |
| JP | 2018-534706 A | 11/2018 |
| JP | 2020-095687 A | 6/2020 |

OTHER PUBLICATIONS

Yubico: "Are Exploits in There? Breaking FIDO", Jan. 1, 2016, XP055674566, Retrieved from Internet: URL:https://www.blackhat.com/docs/us-16/materials/us-16-Chong-Breaking-FIDO-Are-Exploits-In-There.pdf.[retrieved on Mar. 6, 2020]; Cited in Extended European Search Report dated Jan. 26, 2021. (25 pages).
Extended European Search Report dated Jan. 26, 2021, issued in counterpart EP Application No. 20191714.3. (7 pages).
"FIDO Alliance", [Online], [searched on Nov. 22, 2018], Internet <https://fidoalliance.org/fido2/>, cited in Specification (6 pages).
"FIDO Alliance", [Online], [searched on Nov. 22, 2018], Internet <https://fidoalliance.org/specifications/overview/>, cited in Specification (3 pages).
Office Action dated Sep. 20, 2022, issued in counterpart CN application No. 202010922064.2 with English translation. (19 pages).

* cited by examiner

CONTROL METHOD AND INFORMATION PROCESSING APPARATUS

CROSS-REFERENCE TO RELATED APPLICATION

This application is based upon and claims the benefit of priority of the prior Japanese Patent Application No. 2019-164811, filed on Sep. 10, 2019, the entire contents of which are incorporated herein by reference.

FIELD

The embodiment discussed herein is related to a control method and an information processing apparatus.

BACKGROUND

There is an existing case where identification is performed for logging into services via the Internet, such as online banking or net shopping. In recent years, new online authentication technology using biometric authentication or the like is being standardized by Fast IDentity Online Alliance (FIDO Alliance), and is adopted in online banking services and the like. In the authentication method for which standardization is advanced by the FIDO Alliance, secure authentication is realized, by a combination of local authentication using biometric information or the like and signature verification by public key cryptography via a network, without flowing confidential information such as the biometric information to the Internet. The local authentication means authentication performed, while holding registration data in an external authenticator (local authentication) such as a terminal or a smartphone used by a user, in the terminal or the external authenticator.

When accessing an authenticator from the JavaScript (registered trademark) of a browser to perform biometric authentication in authentication ("FIDO Alliance", [Online], [searched on Nov. 22, 2018], Internet <https://fidoalliance.org/fido2/>) compliant with FIDO 2.0, it is possible to be coupled to the authenticator via a bridge interface such as Universal Serial Bus (USB)/Bluetooth (registered trademark) Low Energy (BLE)/Near Field Communication (NFC) using a Client-to-Authenticator Protocol (CTAP).

Japanese Laid-open Patent Publication No. 2009-118110 is an example of related art.

"FIDO Alliance", [Online], [searched on Nov. 22, 2018], Internet <https://fidoalliance.org/specifications/overview/> is an example of related art.

SUMMARY

According to an aspect of the embodiments, a control method executed by a computer, the method includes receiving a program to identifiably display an authentication screen of a service transmitted from an authenticator in response to a reception of a first authentication request from a browser included in a terminal device to the authenticator, the browser displaying the authentication screen at the terminal device, and transmitting the received program to the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

When the browser is coupled to the authenticator via the bridge interface as described above, there is a necessity for safely coupling an authorized browser and the authenticator each other, and there is a necessity for restraining an authentication result of the authenticator from being transmitted to an unauthorized program.

Hereinafter, an embodiment of a technology capable of restraining an authentication result of an authenticator from being transmitted to an unauthorized program will be described in detail with reference to the drawings.

Figure 1:
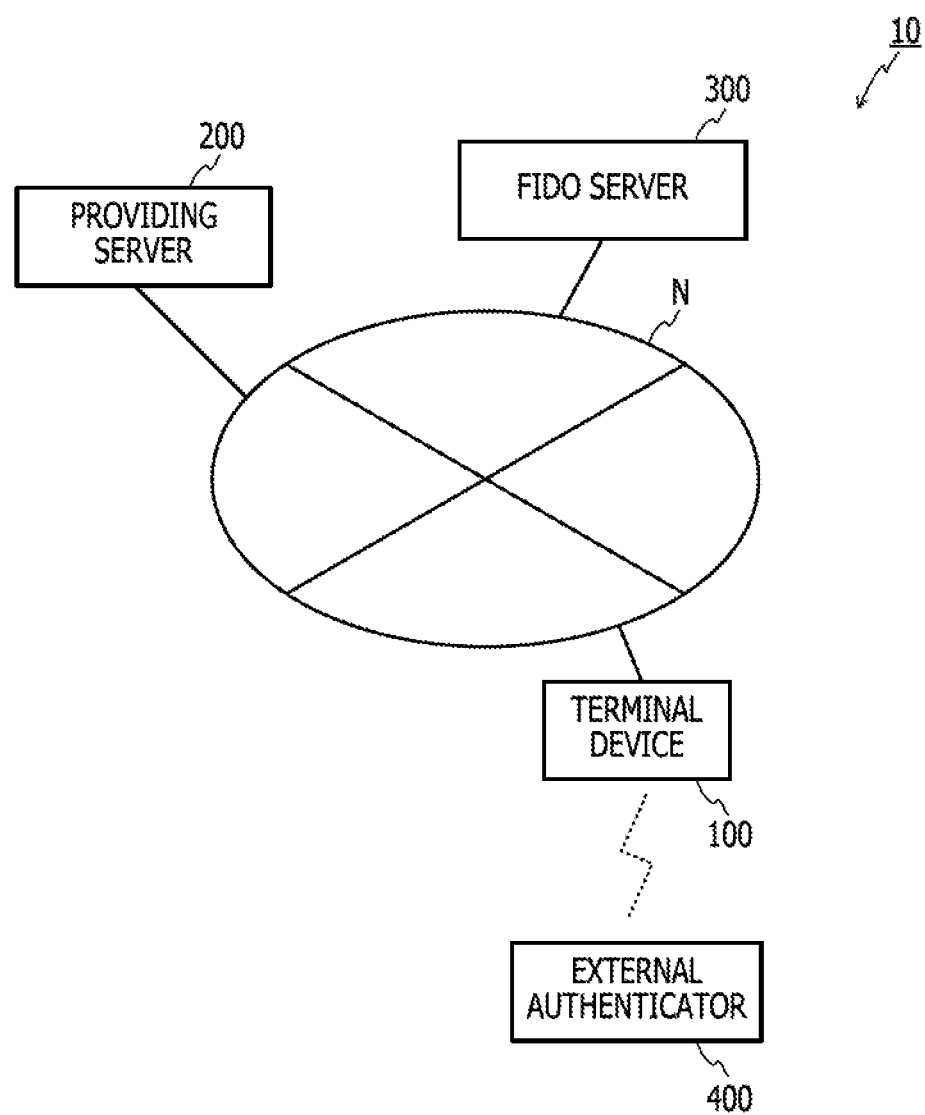
FIG. 1 is a diagram schematically illustrating a configuration of an information processing system according to an embodiment.

FIG. 1 is a diagram illustrating an example of a configuration of an information processing system 10 according to the embodiment. As illustrated in FIG. 1, the information processing system 10 according to the present embodiment includes a terminal device 100, an external authenticator 400 as an authenticator, a providing server 200 as an information processing apparatus, and a FIDO server 300. In the information processing system 10, the number of terminal devices 100, the number of external authenticators 400, the number of providing servers 200, and the number of FIDO servers 300 are not limited, and the arbitrary number of terminal devices 100, the arbitrary number of external authenticators 400, the arbitrary number of providing servers 200, and the arbitrary number of FIDO servers 300 may be included. The terminal device 100 and the providing server 200 are, the terminal device 100 and the FIDO server 300 are, and the providing server 200 and the FIDO server 300 are communicably coupled to each other via a network N. As the network N, any type of communication network such as a local area network (LAN) and a virtual private network (VPN) which may be wired or wireless as well as the Internet may be adopted. Communication performed via the network N is encrypted by, for example, Transport Layer Security (TLS)/Secure Sockets Layer (SSL) or the like. The terminal device 100 and the external authenticator 400 are coupled to each other through near-field communication (NFC), Bluetooth (registered trademark) Low Energy (BLE), Universal Serial Bus (USB), or the like.

When a user uses a service (for example, an online banking service) provided by the providing server 200 in the terminal device 100, the information processing system 10 performs user authentication processing by collating biometric information of the user by the external authenticator 400 coupled to the terminal device 100. The external authenticator 400 signs an authentication result, and transmits the authentication result to the FIDO server 300. When there is no problem in signature verification, the providing server 200 provides the service to the user. Here, the terminal device 100 is an information processing apparatus for the user to use the service provided by the providing server 200. It is assumed that the terminal device 100 is, for example, a stationary personal computer in which a biometric sensor or the like is not built. The terminal device 100 may be a kiosk terminal such as an automatic teller machine (ATM) used by unspecified number of users. It is assumed that the external authenticator 400 is a smartphone having a fingerprint sensor, for example.

The information processing system 10 of the present embodiment has a function of restraining an unauthorized program (application) installed in the terminal device 100 from performing a malicious operation by using the authentication result obtained by the external authenticator 400 in addition to the function of performing the user authentication processing described above. It is assumed that the unauthorized program is, for example, a program for illegally acquiring the biometric authentication result of the user and transferring money to a transfer destination unintended by the user in online banking.

Figure 2:
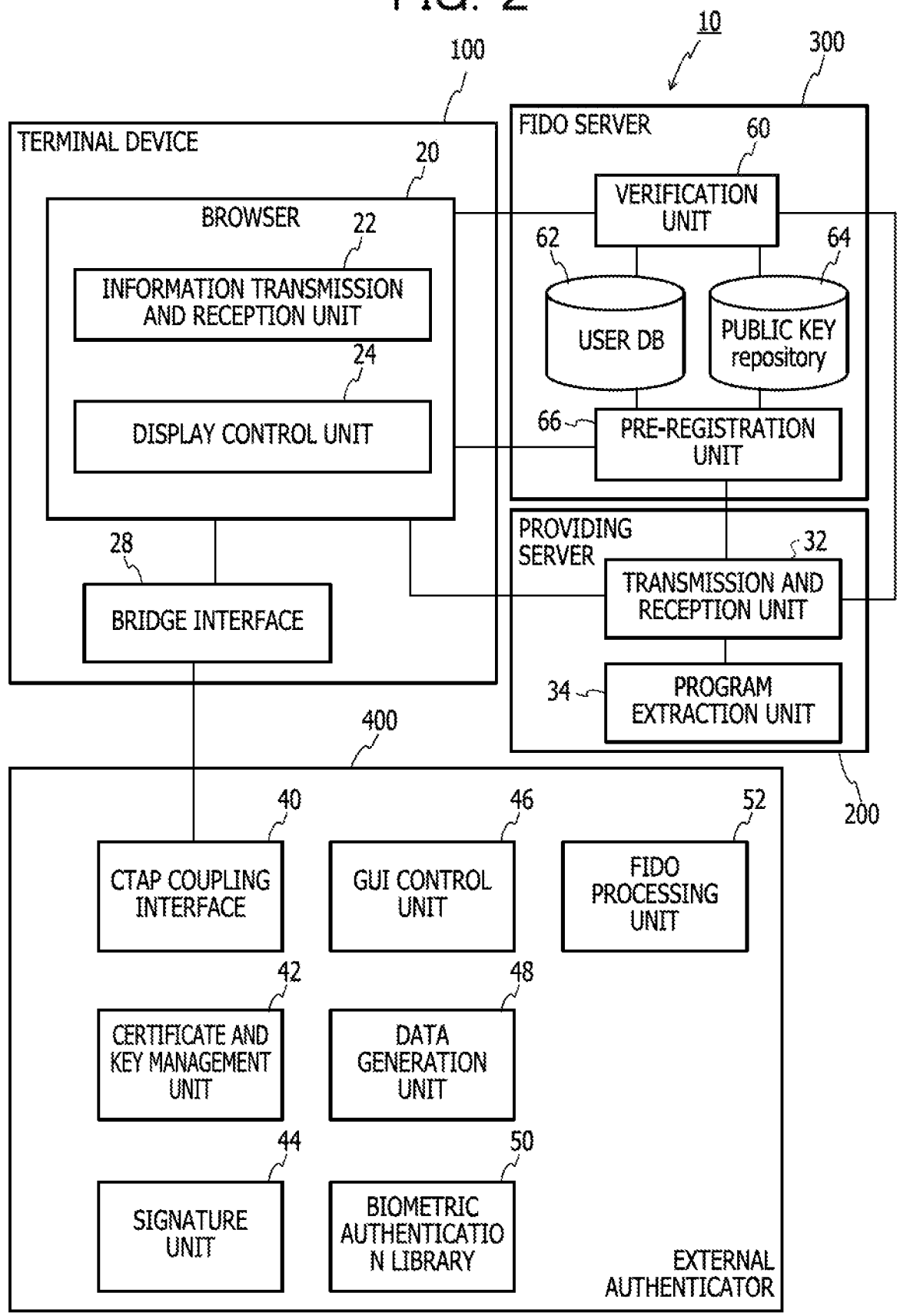
FIG. 2 is a functional block diagram of the information processing system according to the embodiment.

FIG. 2 illustrates a configuration of each device included in the information processing system 10.

As illustrated in FIG. 2, in the terminal device 100, an application such as JavaScript (registered trademark) is executed on a browser 20, and thus, functions as an information transmission and reception unit 22 and a display control unit 24 are realized. Specific functions of the information transmission and reception unit 22 and the display control unit 24 will be described later. The browser 20 is coupled to the external authenticator 400 via a bridge interface 28. The browser may have a plurality of tab screens (tabs), but there will be described in the present embodiment that the tabs are considered as being separate browsers for the sake of convenience in description. The browser 20 is an example of software that displays a service screen of the providing server 200 at a display unit 193.

Figure 12A:
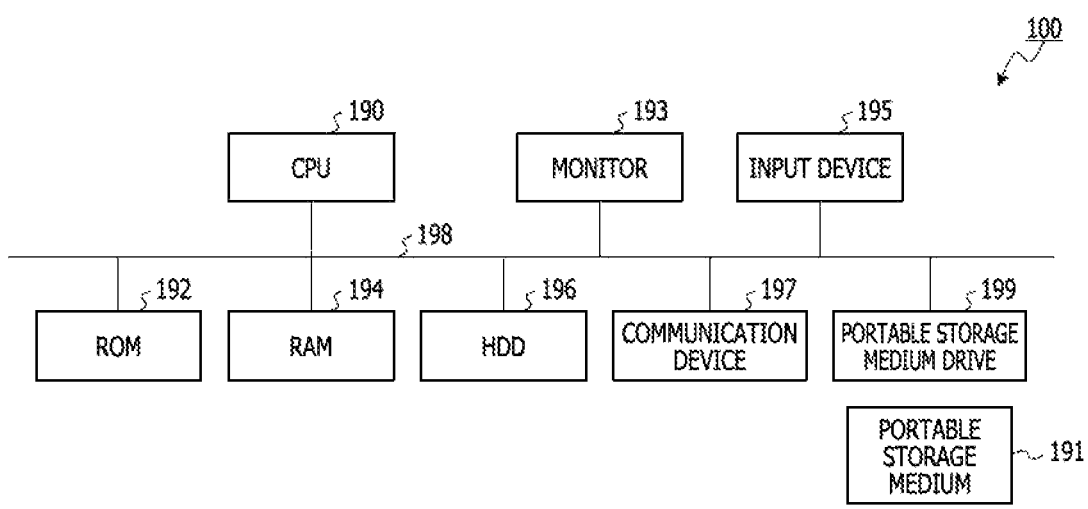
FIG. 12A is a diagram illustrating an example of a hardware configuration of the terminal device.

Here, the terminal device 100 has a hardware configuration as illustrated in FIG. 12A, for example. The terminal device 100 includes a central processing unit (CPU) 190 that executes various kinds of arithmetic processing, an input device 195 that receives a data input, and a monitor 193 as a display unit. The terminal device 100 includes a portable storage medium drive 199 for reading a program or the like from a portable storage medium 191, and a communication device 197 for wired or wireless coupling to other information processing apparatuses or the like. The terminal device 100 includes a read-only memory (ROM) 192, a random-access memory (RAM) 194, and a hard disk drive (HDD) 196. These devices included in the terminal device 100 are coupled to a bus 198.

The ROM 192 stores a control program having the functions of the units illustrated in FIG. 2. The input device 195 receives, for example, inputs of various kinds of information such as operational information from a user of the terminal device 100. The monitor 193 displays, for example, various screens such as a display screen for the user of the terminal device 100. The communication device 197 is coupled to, for example, the network N and exchanges various kinds of information with other information processing apparatuses and the like.

The CPU 190 reads the control program stored in the ROM 192, loads the program to the RAM 194, and executes the program to perform various kinds of processing. The control program may cause the terminal device 100 to function as each unit illustrated in FIG. 2.

The control program described above may not be stored in the ROM 192. For example, the terminal device 100 may read and execute the program stored in the portable storage medium 191 that is readable by the terminal device 100. Examples of the portable storage medium 191 include a compact disc (CD)-ROM, a digital versatile disc (DVD), a USB memory, and the like. This control program may be stored in devices coupled to a public network, the Internet, a LAN, and the like, and the terminal device 100 may read and execute the control program from the devices.

Referring back to FIG. 2, the external authenticator 400 includes a CTAP coupling interface 40, a certificate and key management unit 42, a signature unit 44, a graphical user interface (GUI) control unit 46, a data generation unit 48, a biometric authentication library 50, and a FIDO processing unit 52.

The CTAP coupling interface 40 is coupled to the terminal device 100 through the bridge interface 28 using the CTAP protocol. The CTAP protocol is a protocol, which is adopted from the FIDO 2.0, for accessing an authenticator.

The certificate and key management unit 42 manages a private key of the external authenticator 400 and a TLS certificate (including a public key) received from the providing server 200. When a signature request is transmitted from the providing server 200 via the browser 20, the signature unit 44 executes signature processing. In the user authentication processing, when the data generation unit 48 determines that the authentication is OK, which will be described later, the signature unit 44 signs by using the private key of the external authenticator 400 managed by the certificate and key management unit 42. The signature unit 44 transmits the signature as a result of the user authentication processing to the FIDO server 300 via the terminal device 100.

The GUI control unit 46 displays an input dialog for the biometric authentication on a monitor 293. The GUI control unit 46 displays a plurality of programs for identifiably displaying a browser (tab) for displaying a service for which an authentication request is issued to the external authenticator 400, and prompts the user to select the program. Here, the program for identifiably displaying the browser includes, for example, a program for displaying a predetermined number (for example, "123") on the browser, a program for blinking the browser, a program for displaying the browser in a frame of a predetermined color (for example, a red frame), a program for displaying the browser in the forefront, and the like.

The data generation unit 48 generates collation data from an image acquired from a biometric sensor 289 (see FIG. 12B) included in the external authenticator 400. In the user authentication processing, the data generation unit 48 compares biometric data stored in the biometric authentication library 50 and the generated collation data with each other, and determines whether the authentication is OK or NG.

The FIDO processing unit 52 executes various kinds of processing for restraining the malicious operation by the unauthorized program. For example, the FIDO processing unit 52 transmits the program selected by the user to the providing server 200 via the browser 20.

Figure 12B:
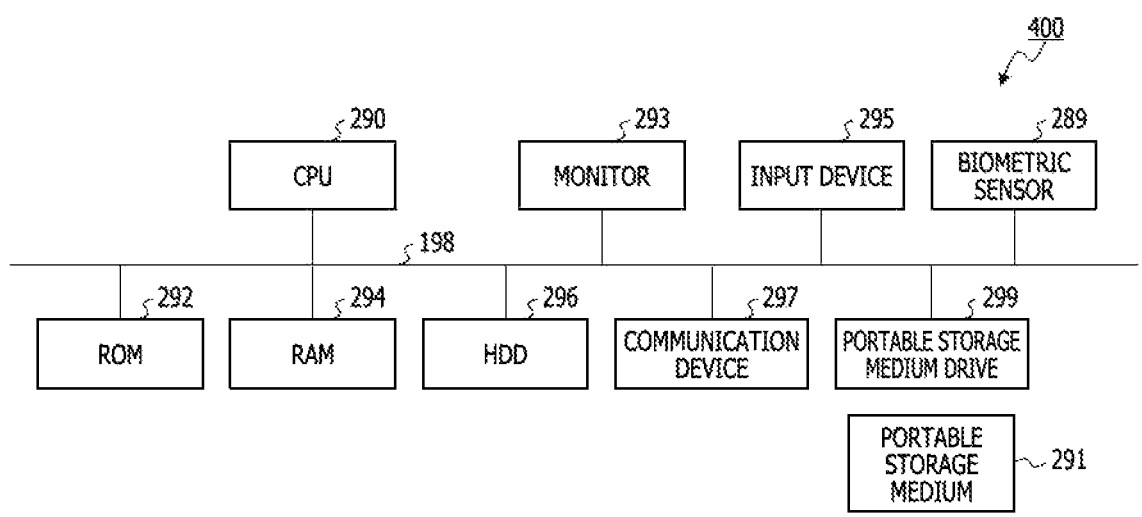
FIG. 12B is a diagram illustrating an example of a hardware configuration of the external authenticator.

Here, the external authenticator 400 has a hardware configuration as illustrated in FIG. 12B, for example. Similarly to the terminal device 100 described above, the external authenticator 400 includes a CPU 290, a ROM 292, a RAM 294, an HDD 296, an input device 295, the monitor 293, and a communication device 297. The external authenticator 400 includes a portable storage medium drive 299 that reads a program or the like from a portable storage medium 291. The external authenticator 400 further includes the biometric sensor 289 such as a fingerprint sensor or a vein sensor. Each of these devices included in the external authenticator 400 is coupled to a bus 298. For example, the CPU 290 reads each program stored in the ROM 192, loads the program to the RAM 294, and executes the program to function as each unit of the external authenticator 400 illustrated in FIG. 2.

The providing server 200 is a server that provides various services. When the FIDO server 300 verifies that there is no problem in the result (authentication result) of the authentication processing performed by the external authenticator 400, which will be described later, the providing server 200 transmits a Web page for providing a dedicated service of the user to the terminal device 100. In the present embodiment, it is assumed that a domain name of the providing server 200 is, for example, "abc.com". Here, the providing server 200 includes a transmission and reception unit 32 and a program extraction unit 34. The transmission and reception unit 32 exchanges information with the terminal device 100 and the FIDO server 300. The program extraction unit 34 extracts a program for identifiably displaying the browser from a response transmitted from the FIDO processing unit 52 of the external authenticator 400. The program extracted by the program extraction unit 34 is transmitted to the browser 20 of the terminal device 100 by the transmission and reception unit 32. Accordingly, the browser 20 that receives the program is identifiably displayed according to a content of the program. In the present embodiment, the transmission and reception unit 32 functions as a reception unit that receives the program, and the transmission and reception unit 32 and the program extraction unit 34 function as a transmission unit that transmits the program to the browser 20.

The FIDO server 300 is a server that controls the authentication processing using the external authenticator 400. The FIDO server 300 includes a pre-registration unit 66 and a verification unit 60. The pre-registration unit 66 executes registration processing of the external authenticator 400. The registration processing using the pre-registration unit 66 includes processing for associating a mail address of the user with a user ID (userid) and processing for registering the public key of the external authenticator 400. The verification unit 60 verifies the authentication result when the authentication result is acquired from the external authenticator 400 via the terminal device 100, and transmits information of the user (mail address of the user) to the providing server 200 when there is no problem. In this case, the providing server 200 transmits the Web page (the dedicated Web page of the user) corresponding to the mail address of the user to the browser 20, and starts providing the service to the user. Here, the FIDO server 300 includes a user DB 62 and a public key repository 64. In the user DB 62, the mail address input by the user, the user ID (userid), and the registered information of the external authenticator 400 are associated with each other. The public key repository 64 stores the public key of the external authenticator 400 in association with the user ID.

Figure 13:
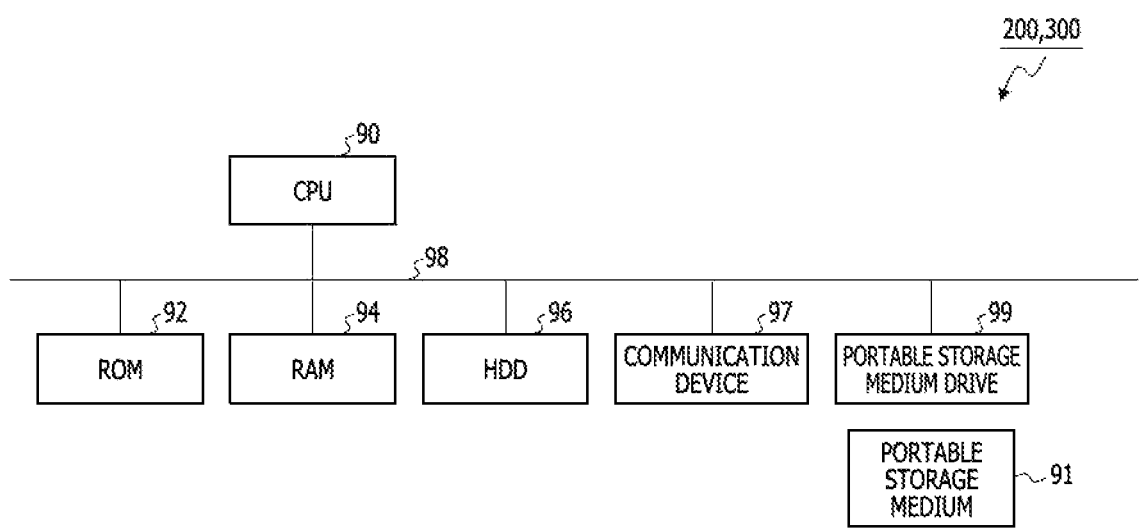
FIG. 13 is a diagram illustrating an example of a hardware configuration of each of a providing server and a FIDO server.

The providing server 200 and the FIDO server 300 have, for example, a hardware configuration as illustrated in FIG. 13. Each of the providing server 200 and the FIDO server 300 includes a CPU 90, a ROM 92, a RAM 94, an HDD 96, and a communication device 97. Each of the providing server 200 and the FIDO server 300 includes a portable storage medium drive 99 that reads a program or the like from a portable storage medium 91. The devices included in the providing server 200 and the FIDO server 300 are coupled to a bus 98. For example, the CPU 90 of the providing server 200 reads a control program stored in the ROM 92, loads the control program to the RAM 94, and executes the control program to function as each unit of the providing server 200 illustrated in FIG. 2. The CPU 90 of the FIDO server 300 may also function as each unit of the FIDO server 300 illustrated in FIG. 2 by similarly executing the program. About processing of information processing system 10

Figure 3:
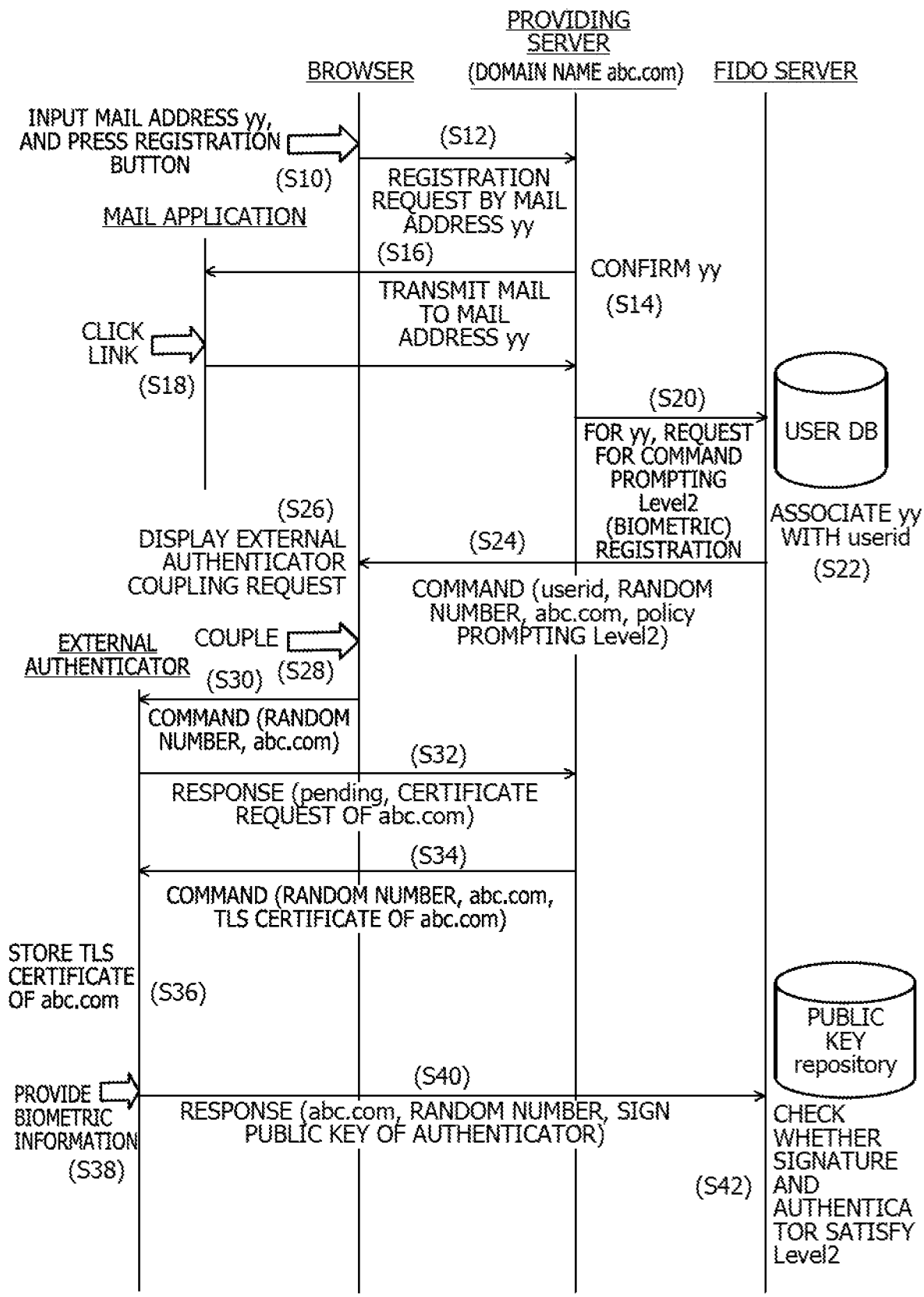
FIG. 3 is a timing chart illustrating registration processing.
Figure 5:
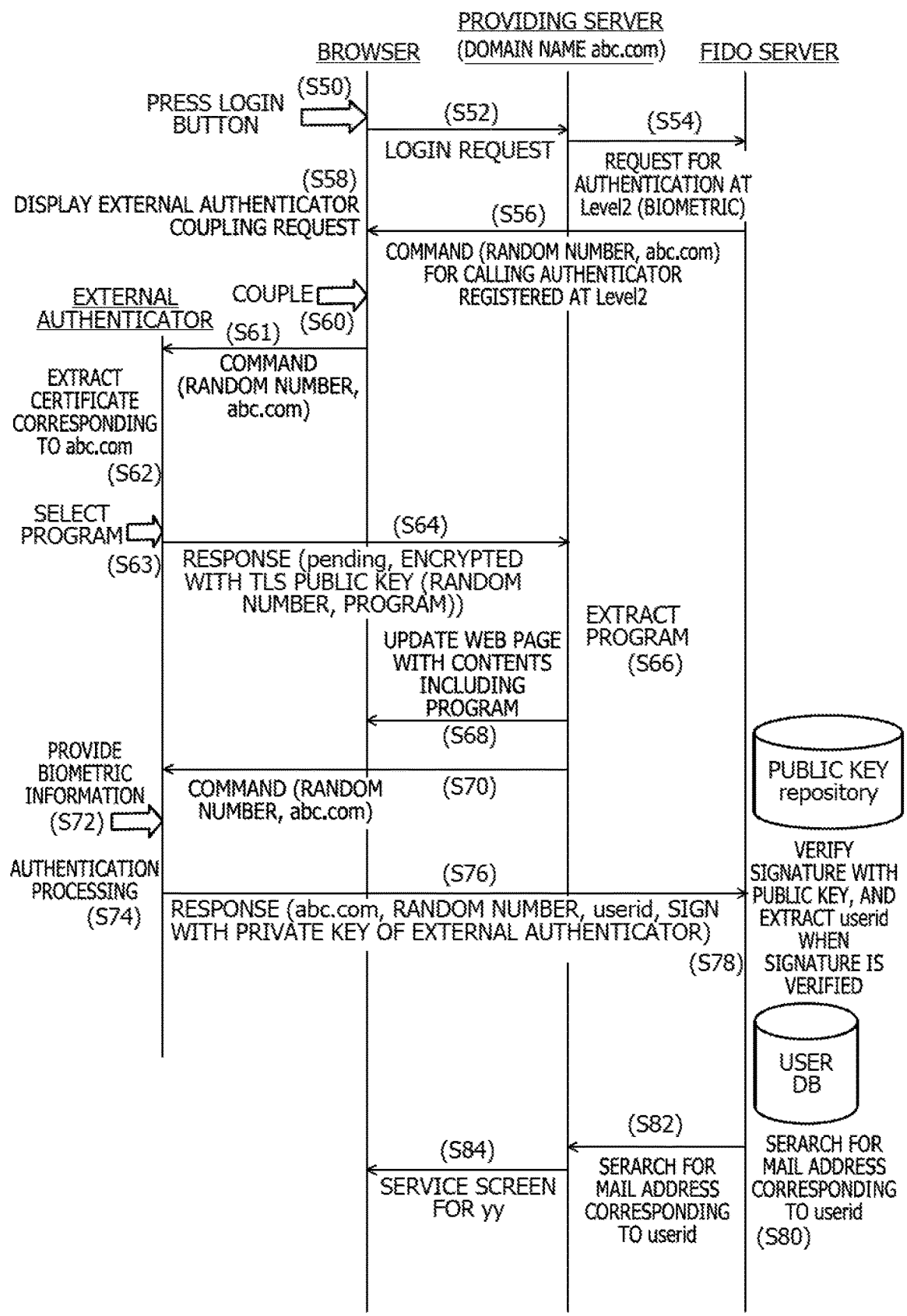
FIG. 5 is a timing chart illustrating processing when a service is used.

Hereinafter, processing of the information processing system 10 will be described in detail with reference to FIGS. 3 and 5. FIG. 3 illustrates processing when the external authenticator 400 is registered, and FIG. 5 illustrates processing when the service is used.

Registration Processing

Figure 4A:
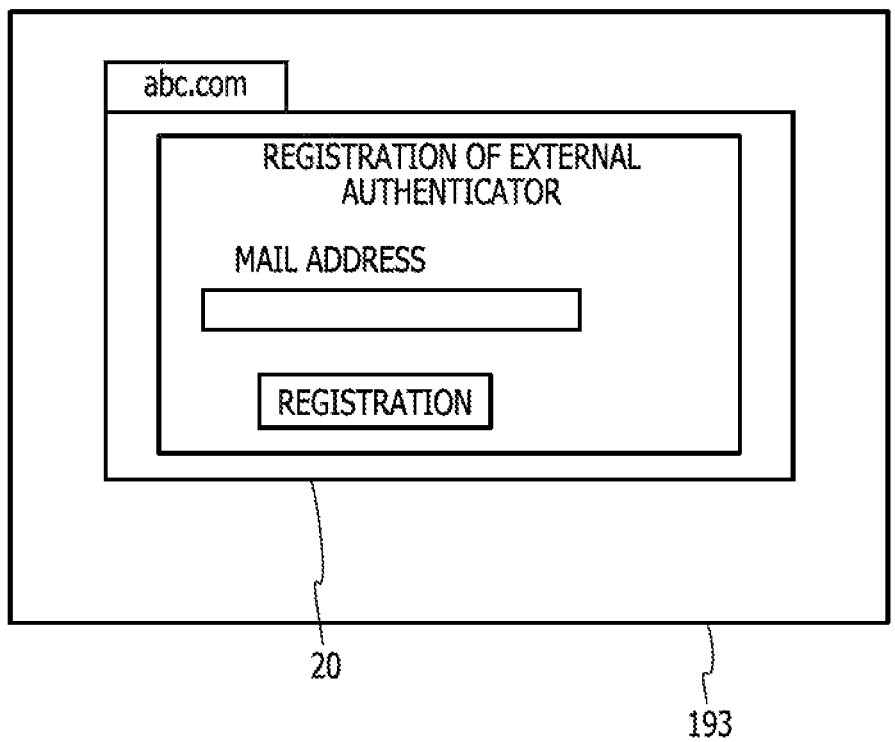
FIGS. 4A and 4B are diagrams illustrating display examples of a terminal device.

As a premise of the processing of FIG. 3, it is assumed that a registration screen as illustrated in FIG. 4A is displayed on the browser 20 displayed on the monitor 193 of the terminal device 100. The registration screen of FIG. 4A includes an input field of the mail address and a registration button. The registration screen of FIG. 4A is a screen for registering information of the external authenticator 400 used for the user authentication in the case of using the service (abc.com) of the providing server 200 in the FIDO server 300, and registering the information (mail address) of the user in the providing server 200.

In the processing of FIG. 3, first, the user inputs the mail address (hereinafter, referred to as "mail address yy") of the user, and presses the registration button (S10). In response to this, the information transmission and reception unit 22 of the browser 20 transmits a registration request for the service use to the transmission and reception unit 32 of the providing server 200 by using the input mail address yy (S12).

Subsequently, the transmission and reception unit 32 of the providing server 200 confirms the mail address yy (S14), and transmits a mail to the mail address yy (S16). It is assumed that a link (URL) for registering the external authenticator 400 is displayed in this mail. When the user opens the mail by using a mail application of the terminal device 100 and clicks the link in the mail (S18), the mail application notifies the transmission and reception unit 32 of the providing server 200. In this case, the transmission and reception unit 32 of the providing server 200 requests the pre-registration unit 66 of the FIDO server 300 to transmit a command for prompting Level2 (biometric) registration for the mail address yy (S20).

When the request is received from the transmission and reception unit 32 of the providing server 200, the pre-registration unit 66 of the FIDO server 300 associates the mail address yy with the user ID (userid) in the user DB 62 (S22). The transmission and reception unit 32 transmits a command to the information transmission and reception unit 22 of the browser 20 (S24). This command includes the userid, a random number, the domain name (abc.com) of the providing server 200, and a policy for prompting Level2 (biometric). Here, the random number is generated by a random number generation function of the pre-registration unit 66 of the FIDO server 300. It is assumed that the user ID is identification information input by the user in advance.

Figure 4B:
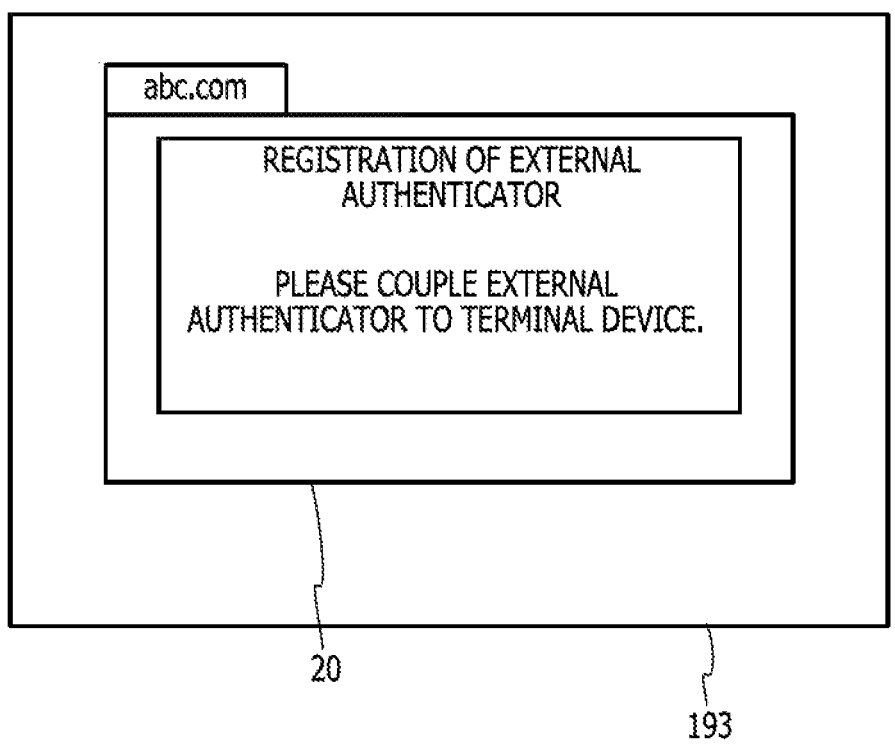

When the command is received from the providing server 200, the information transmission and reception unit 22 of the browser 20 notifies the display control unit 24 of the command, and the display control unit 24 displays a request for coupling to the external authenticator 400 (S26). In this case, it is assumed that a message as illustrated in FIG. 4B is displayed on the browser 20. The user couples the external authenticator 400 to the terminal device 100 at a timing of confirming this message (S28).

When the external authenticator 400 is coupled by the user, the information transmission and reception unit 22 of the browser 20 transmits a command including a part of the command received in operation S24 to the FIDO processing unit 52 of the external authenticator 400 (S30). The command transmitted herein includes the random number and the domain name (abc.com) of the providing server 200.

The FIDO processing unit 52 of the external authenticator 400 transmits a response to the received command (S32). This response includes pending information and a request to send the certificate of the providing server 200 (abc.com). When this response is received, the transmission and reception unit 32 of the providing server 200 transmits a command to the FIDO processing unit 52 of the external authenticator 400 (S34). This command includes the random number, the domain name (abc.com) of the providing server 200, and the TLS certificate of the service (abc.com).

Subsequently, the external authenticator 400 stores the TLS certificate of the service (abc.com) included in the command in the certificate and key management unit 42 (S36). The external authenticator 400 may confirm whether or not the random number included in the command matches the random number included in the command received in operation S30, and may perform the processing of operation S36 when the random numbers match. Accordingly, the processing of operation S36 may be performed after checking whether or not the command is tampered with while being transmitted.

When the user provides the biometric information by using the biometric sensor 289 of the external authenticator 400 (S38), the biometric authentication library 50 registers the biometric information. At this stage, the certificate and key management unit 42 generates a key pair (public key and private key) for authentication, and stores the private key. The FIDO processing unit 52 of the external authenticator 400 transmits a response to the pre-registration unit 66 of the FIDO server 300 via the browser 20 (S40). This response includes the domain name (abc.com) of the providing server 200, the random number, and the signature of the public key of the external authenticator 400. The pre-registration unit 66 of the FIDO server 300 checks that the signature and the external authenticator 400 satisfy Level2 (biometric) (authenticity), and registers the public key in the public key repository 64 in association with the userid when the authenticity is confirmed (S42). After operation S42, the pre-registration unit 66 notifies the providing server 200 of the mail address yy registered in the user DB 62. Accordingly, since the providing server 200 may register the mail address yy as the information of the user who receives the provision of the service, the providing server 200 may provide the dedicated service to the user having the mail address yy.

Through the above procedure, the registration processing is ended. Processing when service is used Next, processing of the information processing system 10 when the user uses the service will be described with reference to FIG. 5. As a premise that the processing of FIG. 5 is started, it is assumed that an authentication screen for the service (abc.com) of the providing server 200 as illustrated in FIG. 6A is displayed on the browser 20.

Figure 6A:
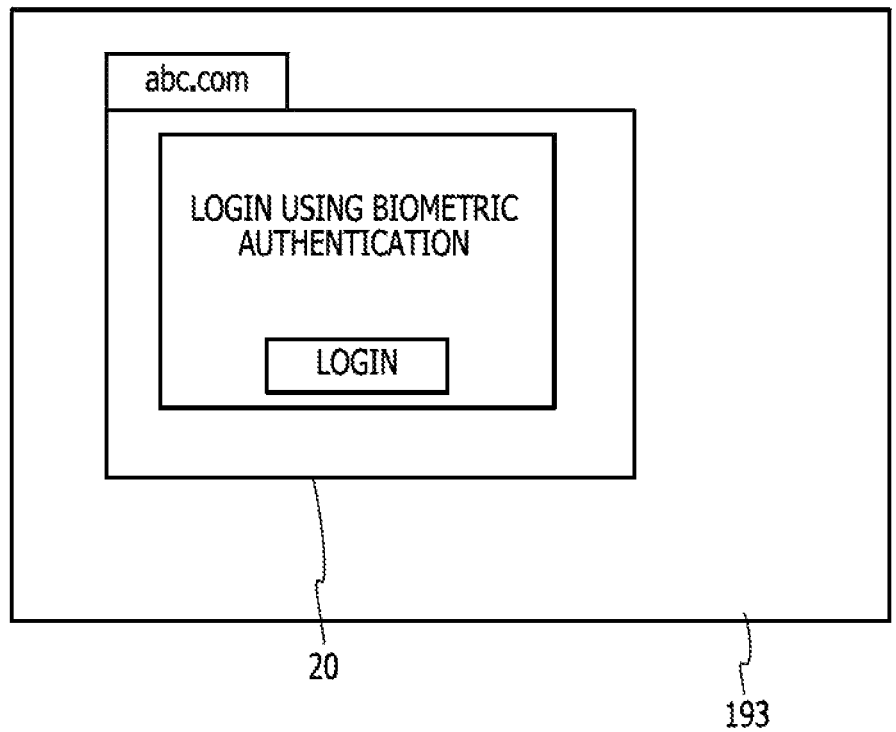
FIG. 6A is a diagram illustrating a display example of the terminal device.

When the user presses a login button in a screen of FIG. 6A (S50), the information transmission and reception unit 22 of the browser 20 transmits a login request to the transmission and reception unit 32 of the providing server 200 (S52). When the login request is received, the transmission and reception unit 32 of the providing server 200 requests the verification unit 60 of the FIDO server 300 to perform authentication at Level2 (biometric) (S54).

The verification unit 60 of the FIDO server 300 transmits a command for calling the external authenticator 400 registered at Level2 to the information transmission and reception unit 22 of the browser 20 (S56). This command includes the random number generated by the verification unit 60 and the domain name (abc.com) of the providing server 200. When the command is received, the information transmission and reception unit 22 of the browser 20 notifies the display control unit 24 of the command, and the display control unit 24 displays a request for coupling of the external authenticator 400 (S58). In this case, it is assumed that a message similar to the message illustrated in FIG. 4B is displayed.

When the user who views this display couples the external authenticator 400 to the terminal device 100 (S60), the information transmission and reception unit 22 of the browser 20 transmits an authentication request command (first authentication request) to the FIDO processing unit 52 of the external authenticator 400 (S61). This command includes the random number received by the information transmission and reception unit 22 of the browser 20 in operation S56 and the domain name (abc.com) of the providing server 200.

Figure 6B:
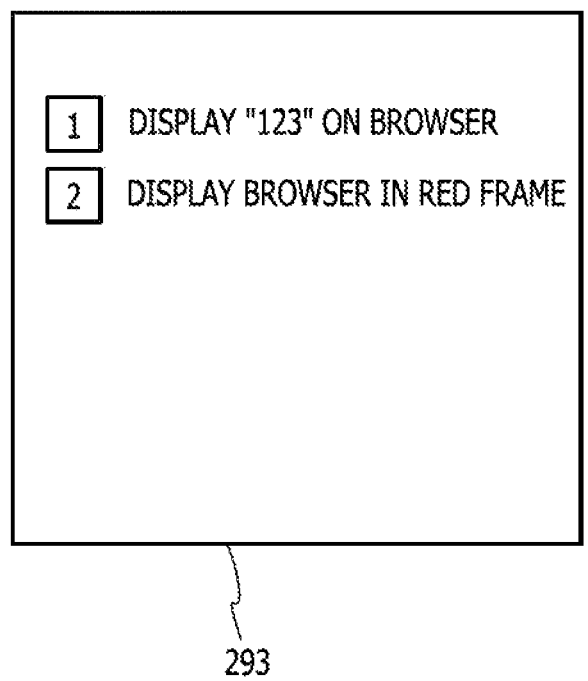
FIG. 6B is a diagram illustrating a display example.

In response to this, the FIDO processing unit 52 of the external authenticator 400 extracts the TLS certificate corresponding to the domain name (abc.com) included in the command from the certificate and key management unit 42 (S62). The user selects a program for identifiably displaying the browser that issues the authentication request at this timing (S63). In this case, for example, contents of a plurality of programs are displayed on the monitor 293 of the external authenticator 400 as illustrated in FIG. 6B. In the example of FIG. 6B, the content of the program for displaying the number "123" on the browser and the content of the program for displaying the browser in a red frame are displayed, and the user may select any one of the programs. In the present embodiment, for example, it is assumed that the user selects the program for displaying the browser in the red frame. The user may select the program in advance.

When the user selects the program, the FIDO processing unit 52 of the external authenticator 400 transmits a response to the transmission and reception unit 32 of the providing server 200 via the browser 20 (S64). This response includes the pending information, the random number encrypted with the public key of the TLS certificate, and the program.

The program extraction unit 34 of the providing server 200 extracts the program from the response by using the private key of the TLS certificate (S66), and the transmission and reception unit 32 updates the Web page of the service (abc.com) with the content including the extracted program (S68). For example, the transmission and reception unit 32 transmits the program to the browser 20 that displays the service (abc.com). Accordingly, the display control unit 24 of the browser 20 that displays the service (abc.com) executes the program, and thus, the browser 20 that issues the authentication request is displayed in the red frame.

The transmission and reception unit 32 of the providing server 200 transmits an authentication request command (second authentication request) to the external authenticator 400 (S70). The command in this case includes the random number and the domain name (abc.com) of the providing server 200. When the random number included in the command and the random number received in operation S61 match, the data generation unit 48 of the external authenticator 400 considers that the command is not tampered with, and permits the biometric authentication of the user by using the external authenticator 400. The user confirms whether or not the browser displayed (displayed in the red frame) according to the program selected by the user in the external authenticator 400 is the browser for displaying the service to which the user intends to log in.

When the user confirms that the browser is the browser for displaying the service to which the user intends to press the login button, the user provides the biometric information such as fingerprint information from the biometric sensor 289 of the external authenticator 400 (S72). Accordingly, the external authenticator 400 executes the authentication processing (S74). In this authentication processing, the data generation unit 48 generates collation data from an image acquired from the biometric sensor, compares biometric data stored in the biometric authentication library 50 with the generated collation data, and determines whether the authentication is OK or NG. When it is determined that the authentication is OK, the signature unit 44 of the external authenticator 400 signs by using the private key of the external authenticator 400 managed by the certificate and key management unit 42, and transmits a response to the verification unit 60 of the FIDO server 300 via the browser 20 (S76). This response includes the domain name (abc.com) of the providing server 200, the random number, the userid, and the signature with the private key of the external authenticator 400.

The verification unit 60 of the FIDO server 300 reads the public key corresponding to the userid included in the response from the public key repository 64, verifies the signature, and extracts the userid when the verification succeeds (S78). The verification unit 60 searches for the mail address yy corresponding to the extracted userid by referring to the user DB 62 (S80).

Thereafter, the verification unit 60 of the FIDO server 300 transmits the check result (mail address yy) to the transmission and reception unit 32 of the providing server 200 (S82). The transmission and reception unit 32 of the providing server 200 transmits a dedicated service screen available by the user having the mail address yy to the information transmission and reception unit 22 of the browser 20 (S84). Accordingly, since the display control unit 24 displays the dedicated service screen of the logged-in user, the user may use the displayed service screen.

Figure 7:
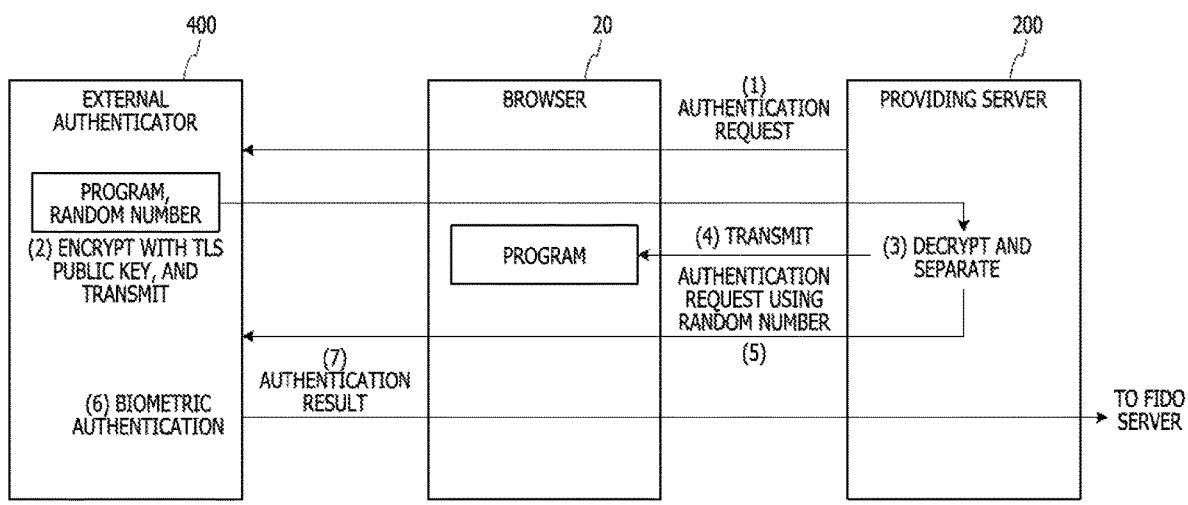
FIG. 7 is a diagram illustrating a simplified main part of processing when the service is used in the embodiment.

FIG. 7 is a diagram illustrating a simplified main part of the processing when the service is used in the information processing system 10 according to the present embodiment.

As illustrated in FIG. 7, the following processing is executed in the present embodiment.

(1) The authentication request command (first authentication request) from the providing server 200 is sent to the external authenticator 400 via the browser 20.

(2) The external authenticator 400 transmits the response to the providing server 200. This response includes the program selected by the user and the random number encrypted with the public key of the TLS certificate.

(3) The providing server 200 decrypts the program and the random number from the response by using an encryption key, and separates (extracts) the program.

(4) The providing server 200 transmits the program to the browser 20. Accordingly, since the browser for displaying the service for which the authentication request is issued is displayed according to the program, the user may recognize that the authentication processing is performed in the service displayed on the browser.

(5) The providing server 200 transmits the authentication request command (second authentication request) using the random number to the external authenticator 400 via the browser 20.

(6) The external authenticator 400 executes the biometric authentication of the user.

(7) The external authenticator 400 transmits the response (authentication result) to the FIDO server 300 after executing the biometric authentication of the user.

By doing this, since the user may reliably deliver the authentication result to the service to which the user intends to log in, the authentication result may be restrained from being delivered to the malicious unauthorized program. Thus, the malicious operation may be restrained from being executed by the malicious program, and the user may be restrained from being damaged by the malicious program.

Here, FIGS. 8A to 10 schematically illustrate a state change of the terminal device 100 (monitor 193) (of a comparative example) when processing (2) to processing (5) of FIG. 7 are not executed. In the example of FIG. 8A to 10, it is assumed that the unauthorized program (malicious program) is installed (operated) in the terminal device 100.

Figure 8A:
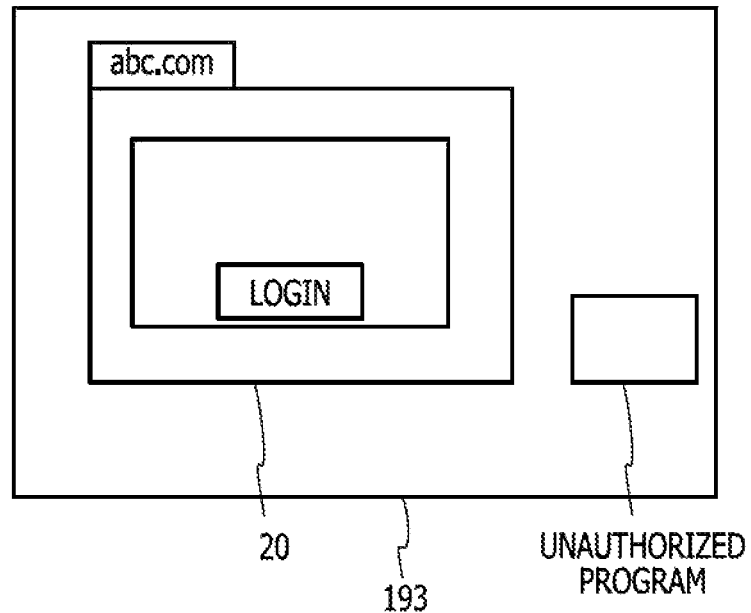
FIGS. 8A and 8B are diagrams (part 1) schematically illustrating a state change of the terminal device according to a comparative example.
Figure 8B:
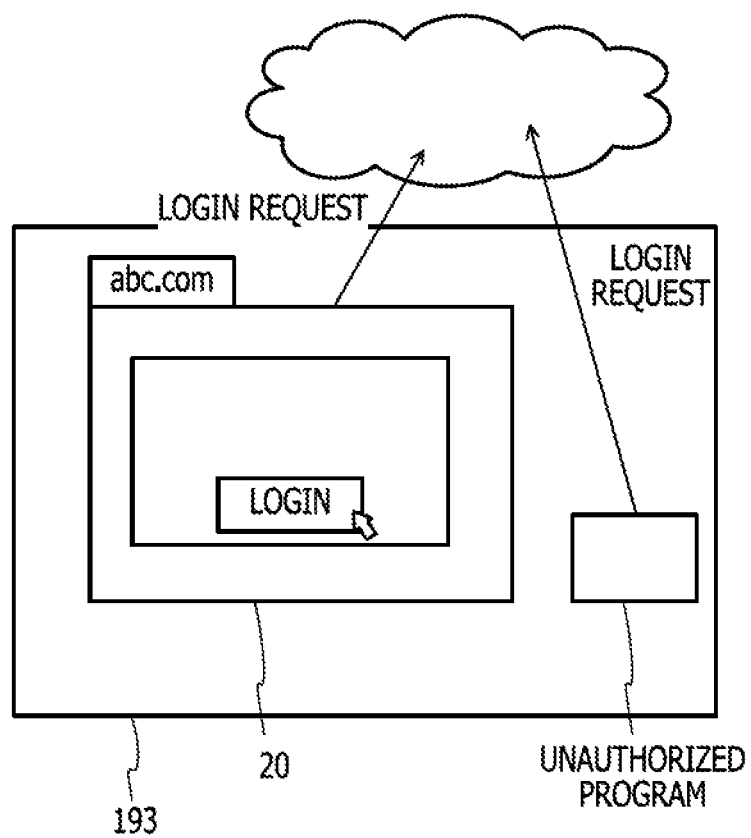
Figure 9A:
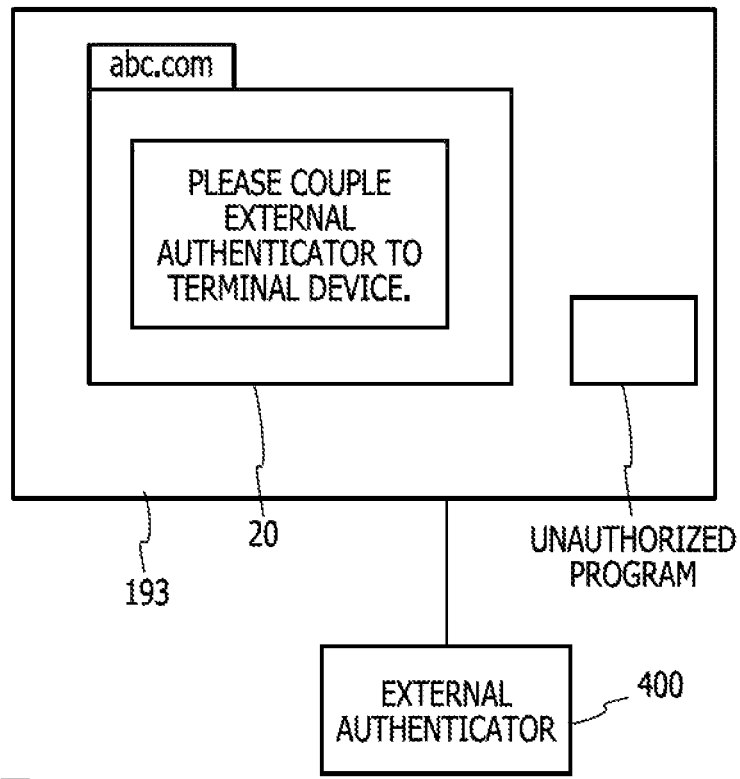
FIGS. 9A and 9B are diagrams (part 2) schematically illustrating the state change of the terminal device according to the comparative example.

As illustrated in FIG. 8A, in the terminal device 100, it is assumed that the user activates the browser 20, accesses the providing server 200 (abc.com), and clicks the login button of the authentication screen displayed on the browser 20. In this case, the unauthorized program confirms an operation of the browser 20, imitates the operation of the browser 20, accesses the providing server 200 in the same manner as the browser 20 as illustrated in FIG. 8B, and performs the login request. As illustrated in FIG. 9A, when the browser 20 displays a coupling request of the external authenticator 400, the user couples the external authenticator 400 to the terminal device 100. At this time, as illustrated in FIG. 9B, the unauthorized program detects that the external authenticator 400 is coupled, and transmits the authentication request command earlier than the browser 20, or interferes with communication between the browser 20 and the external authenticator 400.

Figure 9B:
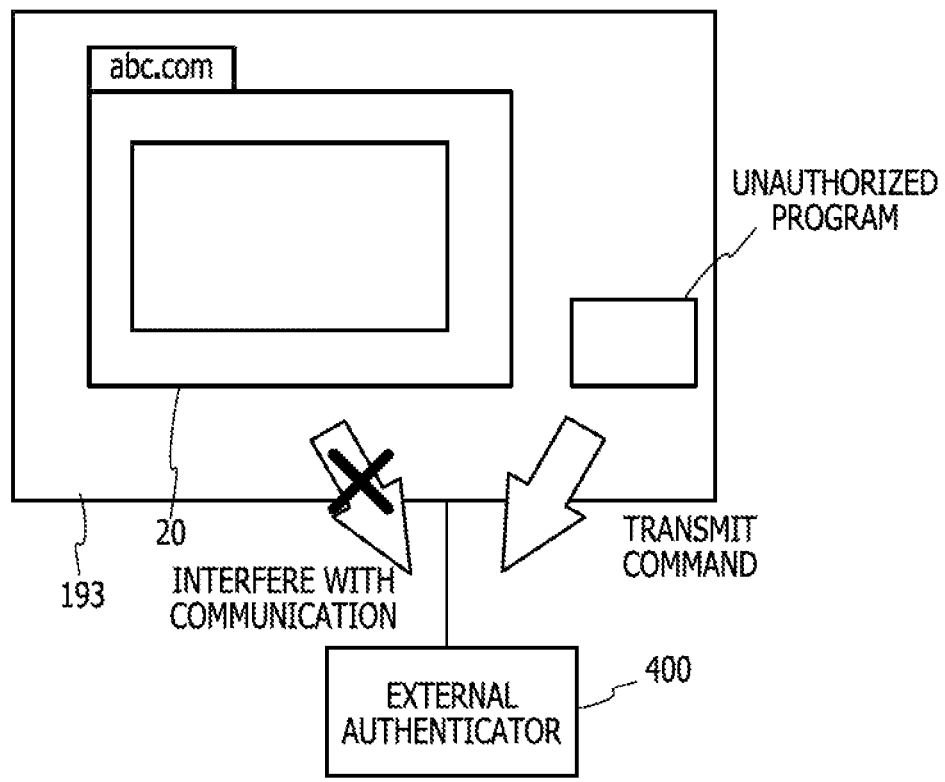
Figure 10:
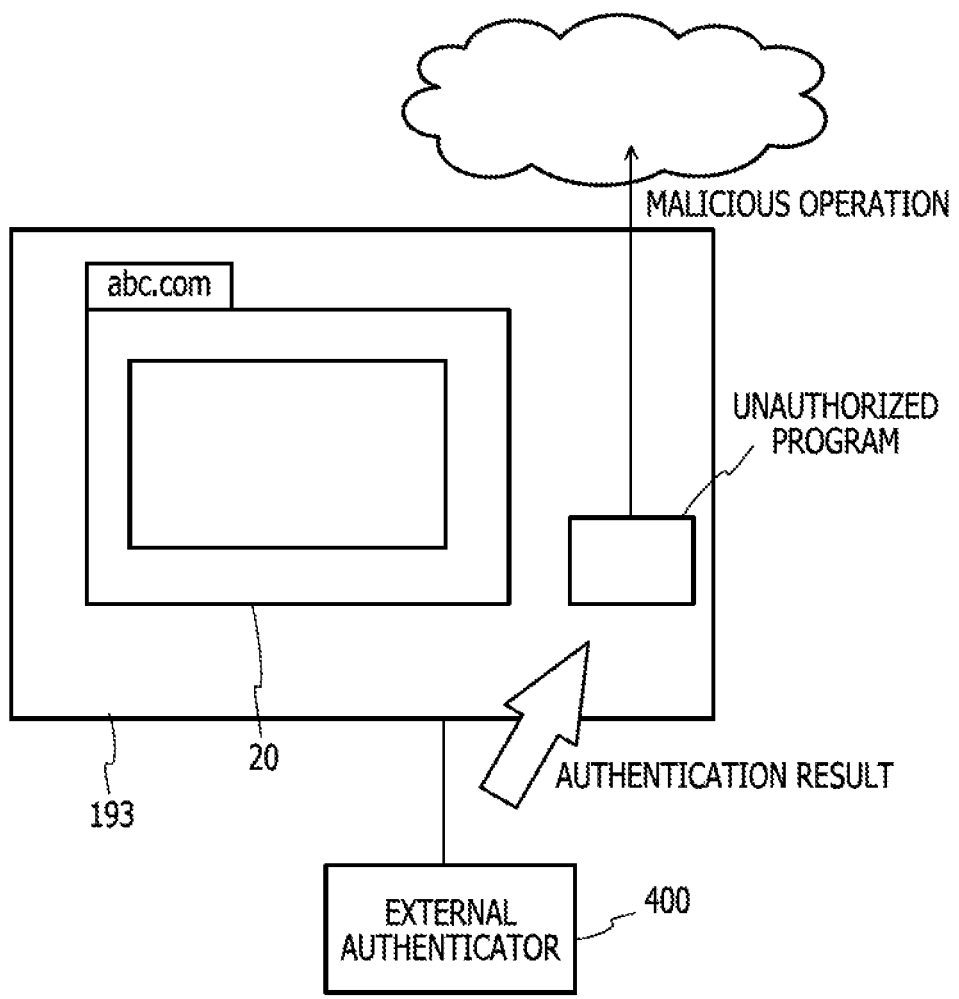
FIG. 10 is a diagram (part 3) schematically illustrating the state change of the terminal device according to the comparative example.

When the biometric authentication is performed by using the external authenticator 400 in the state illustrated in FIG. 9B, since the unauthorized program acquires the authentication result as illustrated in FIG. 10, the unauthorized program may access the providing server 200. Thus, there is a concern that the unauthorized program performs the malicious operation.

Figure 11A:
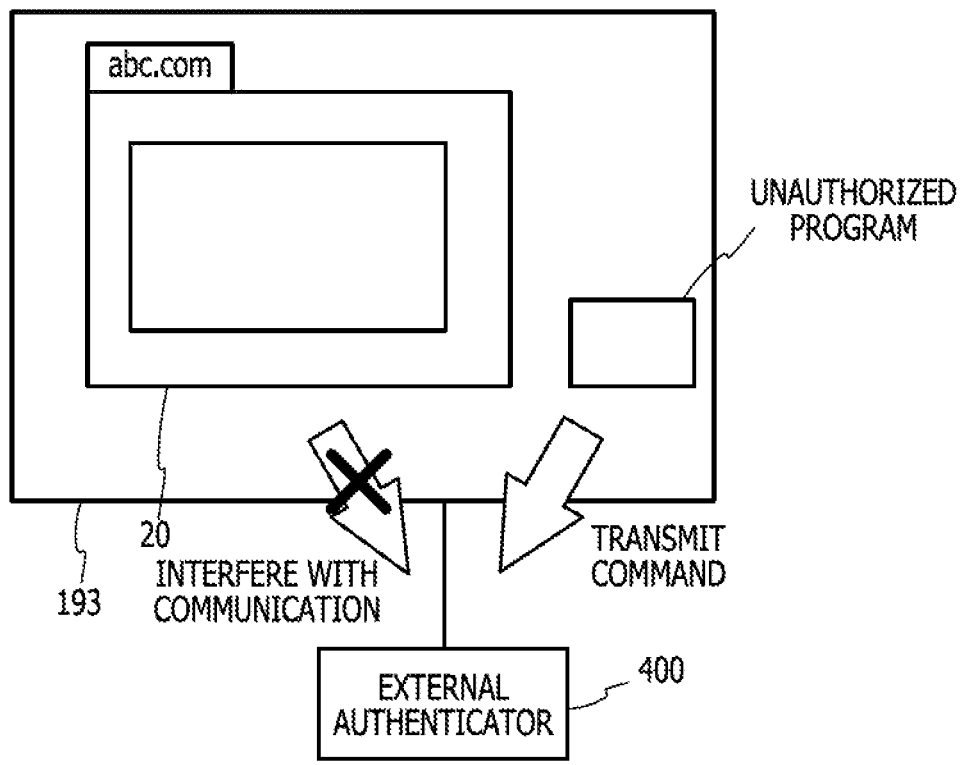
FIGS. 11A and 11B are diagrams schematically illustrating a state change of the terminal device according to the embodiment.
Figure 11B:
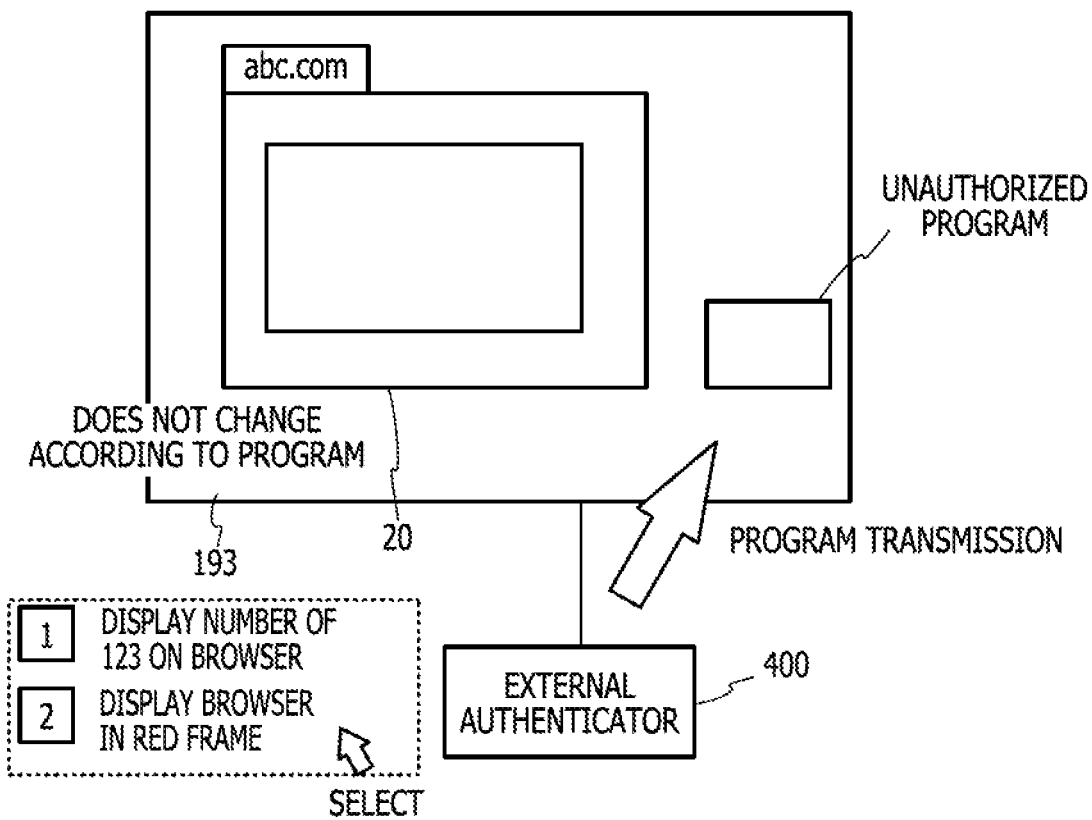

Meanwhile, FIGS. 11A and 11B schematically illustrate a state change of the terminal device 100 (monitor 193) when processing (1) to processing (7) of FIG. 7 are executed as in the present embodiment.

Even in the case of the present embodiment, as illustrated in FIG. 11A, the unauthorized program transmits the command to the external authenticator 400 earlier than the browser 20, or interferes with communication between the browser 20 and the external authenticator 400.

However, in the present embodiment, as illustrated in FIG. 11B, the program is selected before the user performs the biometric authentication in the external authenticator 400, and the external authenticator 400 transmits the selected program to the unauthorized program. In this case, the browser for displaying the service (abc.com) does not change according to the program. Thus, when the user performs the authentication processing in this state, it may be determined that there is a possibility that the authentication result is abused by the unauthorized program. Accordingly, since the user may restrain the biometric information from being provided to the external authenticator 400 under the situation as illustrated in FIG. 11A, the malicious operation may be restrained from being performed by the unauthorized program.

Each part illustrated in the drawings in the embodiment may not be physically configured as illustrated in the drawings. For example, specific forms of dispersion and integration of the parts are not limited to those illustrated in the drawings, and all or part thereof may be configured by being functionally or physically dispersed or integrated in given units according to various loads, the state of use, and the like. The order of processing illustrated in the drawings is not limited to the order described above, and the processing may be simultaneously performed or the order may be switched within the range in which the processing contents do not contradict one another.

All or any of the various processing functions performed in the devices may be executed for a CPU (or a microcomputer, such as a microprocessor unit (MPU) or a microcontroller unit (MCU)). Needless to say, all or given some of the various processing functions may be executed with a program analyzed and executed by a CPU (or a microcomputer such as an MPU or an MCU) or with hardware using wired logic.

As described above in detail, according to the present embodiment, when the authentication request command (first authentication request) is received from the browser 20 for displaying the service authentication screen on the monitor of the terminal device 100 (S61), the external authenticator 400 transmits the program to the providing server 200 (S64). The providing server 200 transmits the received program to the browser 20 of the terminal device 100 (S68). This program is a program for identifiably displaying the authentication screen. Thus, since the browser that transmits the authentication request command to the external authenticator 400 may be identifiably displayed, the user may provide the biometric information to the external authenticator 400 while recognizing to which browser the authentication result is transmitted. Accordingly, since the authentication result may be restrained from being transmitted to the malicious unauthorized program, the malicious operation may be restrained from being executed by the unauthorized program. In the present embodiment, since a personal identification number input (PIN input) may not be performed in order to safely couple the browser 20 and the external authenticator 400 to each other, time and effort of the user may be saved.

In the present embodiment, when the program is transmitted to the browser 20, the providing server 200 transmits the authentication request command (second authentication request) to the external authenticator 400 (S70), and causes the external authenticator 400 to perform the authentication processing. Accordingly, the external authenticator 400 may perform the authentication processing at an appropriate timing at which the browser 20 is recognizably displayed.

In the present embodiment, when the random number is transmitted together with the program as the response from the external authenticator 400 (S64) and the command is transmitted to the external authenticator 400 (S70), the providing server 200 transmits the command including the received random number. Accordingly, when it is checked whether or not the random numbers match, the external authenticator 400 may confirm whether or not the command is tampered with while the command is being transmitted.

Although it has been described in the above embodiment that the user selects the program to be transmitted from the external authenticator 400 to the providing server 200, the embodiment is not limited thereto. For example, the content of the program may be predetermined. Alternatively, the program may be automatically selected in the external authenticator 400, and the content of the selected program may be displayed on the monitor 293 of the external authenticator 400.

Although it has been described in the above embodiment that it is confirmed whether or not the command is tampered with while being transmitted by confirming the random number included in the command, the embodiment is not limited thereto. For example, when the response is transmitted to the providing server 200 in operation S64, the external authenticator 400 may encrypt the program and a session key (random number) with the TLS public key. In this case, the providing server 200 may extract the program and the session key from the response (S66), may encrypt the authentication request command with the session key in operation S70, and may transmit the encrypted authentication request command to the external authenticator 400. By doing this, the command may be restrained from being tampered with while being transmitted.

In the above embodiment, the case where the external authenticator 400 is a smartphone has been described, but the embodiment is not limited thereto, and other Bluetooth (registered trademark) devices, NFC mounted devices, USB tokens, and the like may also be used. For example, when the external authenticator 400 is other than a smartphone, a button or a dial for selecting the program may be mounted instead of the monitor.

In the above embodiment, when the terminal device 100 includes the authenticator (biometric sensor), the authenticator may be used instead of the external authenticator 400.

The functions of the browser 20 described in the above embodiment may be included in an application that operates at the terminal device 100. Even in this case, a screen of the application that performs the authentication processing is recognizably displayed according to the program, and thus, effects similar to the effects of the above embodiment may be obtained.

Although it has been described in the above embodiment that the providing server 200 and the FIDO server 300 are separate devices, the embodiment is not limited thereto. For example, the providing server 200 may have the function of the FIDO server 300. In this case, the providing server 200 may perform the processing of the FIDO server 300 illustrated in FIGS. 3 and 5.

The above-described embodiment is a preferred embodiment. However, the embodiment is not limited to this embodiment, and may be variously modified within the subject matter of the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control method executed by a computer, the method comprising:
    transmitting a first authentication request from a browser included in a terminal device to an authenticator to access a service provided by a providing server, the first authentication request including a random number and a domain name of the providing server;
    in response to the first authentication request, extracting, by the authenticator, a certificate corresponding to the domain name included in the first authentication request, the certificate including a public key;
    transmitting a response from the authenticator to the providing server via the browser, the response including the random number encrypted with the public key of the certificate and a user-selected program from a displayed plurality of programs identifying the browser that transmitted the first authentication request;
    extracting, by the providing server, the user-selected program from the response using a private key of the certificate;
    transmitting, by the providing server, the extracted user-selected program to the browser and a second authentication request including the random number and the domain name of the providing server to the authenticator, the extracted user-selected program displaying an authentication screen of the service at the terminal device; and
    permitting, by the authenticator, biometric authentication of a user with a determination that the random number in the first authentication request matches the random number in the second authentication request.

2. The control method according to claim 1,
    wherein the extracted user-selected program displays the authentication screen in a predetermined mode or displays the authentication screen in a mode selected in the authenticator.

3. An information processing apparatus to provide a service, the information processing apparatus comprising:
    a memory; and
    a processor coupled to the memory and configured to:
        transmit a first authentication request from a browser included in a terminal device to an authenticator to access the service, the first authentication request including a random number and a domain name of the providing server;
        in response to the first authentication request, extract, by the authenticator, a certificate corresponding to the domain name included in the first authentication request, the certificate including a public key;
        transmit a response from the authenticator to the providing server via the browser, the response including the random number encrypted with the public key of the certificate and a user-selected program from a displayed plurality of programs identifying the browser that transmitted the first authentication request;
        extract, by the providing server, the user-selected program from the response using a private key of the certificate;
        transmit, by the providing server, the extracted user-selected program to the browser and a second authentication request including the random number and the domain name of the providing server to the authenticator, the extracted user-selected program displaying an authentication screen of the service at the terminal device; and
        permit, by the authenticator, biometric authentication of a user with a determination that the random number in the first authentication request matches the random number in the second authentication request.

4. The information processing apparatus according to claim 3,
    wherein the extracted user-selected program displays the authentication screen in a predetermined mode or displays the authentication screen in a mode selected in the authenticator.

5. A non-transitory computer-readable recording medium having stored therein a program that causes a computer to execute a process, the process comprising:
    transmitting a first authentication request from a browser included in a terminal device to an authenticator to access a service provided by a providing server, the first authentication request including a random number and a domain name of the providing server;
    in response to the first authentication request, extracting, by the authenticator, a certificate corresponding to the domain name included in the first authentication request, the certificate including a public key;
    transmitting a response from the authenticator to the providing server via the browser, the response including the random number encrypted with the public key of the certificate and a user-selected program from a displayed plurality of programs identifying the browser that transmitted the first authentication request;
    extracting, by the providing server, the user-selected program from the response using a private key of the certificate;
    transmitting, by the providing server, the extracted user-selected program to the browser and a second authentication request including the random number and the domain name of the providing server to the authenticator, the extracted user-selected program displaying an authentication screen of the service at the terminal device; and
    permitting, by the authenticator, biometric authentication of a user with a determination that the random number in the first authentication request matches the random number in the second authentication request.

* * * * *